United States Patent Office 3,652,710
Patented Mar. 28, 1972

3,652,710
CURABLE POLYARYLENEOXIDE COMPOSITIONS
Fred F. Holub, Schenectady, and Carl M. Emerick, Mechanicville, N.Y., assignors to General Electric Company
No Drawing. Filed July 1, 1969, Ser. No. 838,316
Int. Cl. C08f 27/08
U.S. Cl. 260—823                        9 Claims

ABSTRACT OF THE DISCLOSURE

Polyaryleneoxide having at least one chemically combined aliphatically unsaturated imido radical is provided and a method for making such materials. Blends of the imido-substituted polyaryleneoxide and a variety of aliphatically unsaturated organic monomers, such as styrene, diallylphthalate, N-phenylmaleimide, or organic polymers such as polystyrene, polysulfone, polycarbonate, polyphenyleneoxides, etc., also are provided. The imido-substituted compositions of the present invention can be employed as coatings, varnishes, injection molding compounds, laminating compounds, etc.

---

The present invention relates to polyaryleneoxide compositions comprising polyaryleneoxide having at least one chemically combined aliphatically unsaturated imido radical, such as a maleimido radical, and methods for making such polyaryleneoxide compositions.

The polyaryleneoxide compositions comprise polyaryleneoxide having at least one chemically combined aliphatically unsaturated imido radical of the formula,

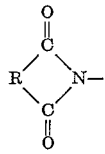

(I)

where R is a divalent aliphatically unsaturated organo radical selected from hydrocarbon radicals and halogenated hydrocarbon radicals. Included by R of Formula 1 are radicals of the formula,

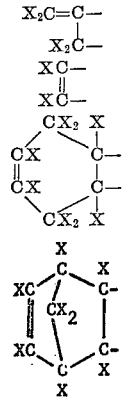

etc., where X is selected from hydrogen, chloro, lower alkyl such as methyl, ethyl, propyl, butyl, and mixtures of such radicals.

Imido-substituted polyarylene oxides included within the scope of the present invention having at least one chemically combined imido radical of Formula 1, consist essentially of chemically combined units of the formula, (1)                —ZO— where Z is selected from M, or MQ, substituted divalent organo radicals, or a mixture of radicals comprising such M, or MQ, substituted divalent organo radicals, and divalent organo radicals free of M or MQ-substitution, where M is an imido radical included by Formula 1, and Q is a divalent organo connective defined below.

Z radicals can be M or MQ-substituted and include for example, (a) aromatic carbocyclic radicals having from 6 to 18 carbon atoms selected from hydrocarbon radicals and halogenated hydrocarbon radicals,
(b) A, Y, and A radicals, where A is selected from (a) radicals and Y is a divalent organo connective defined below,
(c) a mixture of (a) and (b), and
(d) a mixture of organo radicals having at least 5 mole percent of chemically combined (a), (b), or (c) radicals and up to 95 mole percent of chemically combined divalent saturated aliphatic radicals selected from hydrocarbon radicals and halogenated hydrocarbon radicals, based on the total moles of (d) radicals, Y is a divalent connective selected from

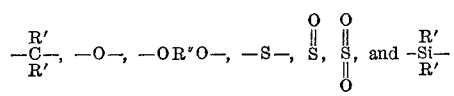

R' is a monovalent radical selected from hydrogen, hydrocarbon radicals and halogenated hydrocarbon radicals, R'' is a divalent radical selected from hydrocarbon radicals and halogenated hydrocarbon radicals, and Q is a divalent radical selected from

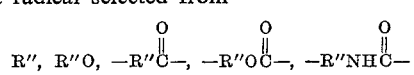

etc.

Radicals included by Z are, for example, arylene radicals and halogenated arylene radicals, such as phenylene, chlorophenylene, 2,6-dimethylphenylene, 2,6 - diphenylphenylene, 3,5-diethylphenylene, 2-chloro-6-methylphenylene, tolylenexylylene, naphthylene, chloronaphthaylene, anthrylene, etc. Radicals included by R', are, for example, aryl radicals such as phenyl, tolyl, xylyl, naphthyl, alkyl having from 1 to 8 carbon atoms such as methyl, ethyl, propyl, butyl, pentyl, etc.; cycloalkyl and alkenyl such as cyclohexyl, vinyl, allyl, etc.; halogenated hydrocarbon such as chlorophenyl chloronaphthyl, etc. Radicals included by R'' are, for example, alkylene, such as methylene, ethylene, propylene, and arylene radicals such as phenylene, chlorophenylene, tolylene, xylene, and naphthylene, etc.

M-substituted Z radicals included by Formula 2 are, for example,

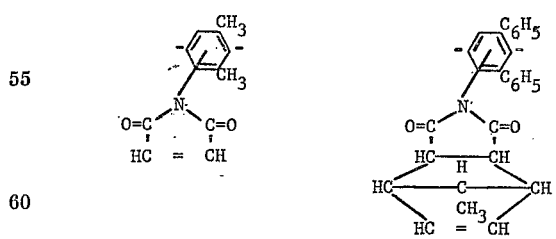

MQ-substituted radicals included by Formula 2 are, for example,

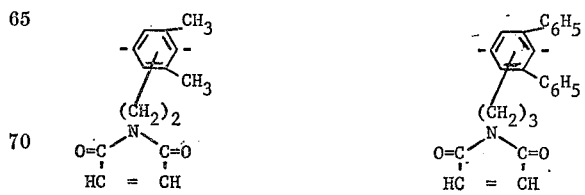

Included by the imido-substituted polyaryleneoxides consisting essentially of chemically combined units of Formula 2, are imido-substituted polyphenyleneoxides consisting essentially of chemically combined units of the formula, (3)

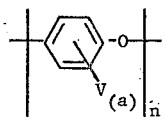

where V is a monovalent radical selected from hydrogen, hydrocarbon radicals free of tertiary $a$-carbon atoms, and having at least two carbon atoms between any halogen atom and phenol nucleus, hydrocarbonoxy radicals free of tertiary $a$-carbon atoms, halogenated hydrocarbonoxy radicals free of tertiary $a$-carbon atoms and having at least two carbon atoms between any halogen and the phenol nucleus, imido radicals of Formula 1, and MQ radicals as previously defined, $a$ is a whole number equal to 0 to 4 inclusive and $n$ is an integer of from 2 to 1,000 inclusive, and preferably 5 to 500 inclusive.

In addition to the polyphenyleneoxides of Formula 3, there also is included by the polyaryleneoxides consisting essentially of chemically combined units of Formula 2, polymers consisting essentially of chemically combined units of the formula, (4) 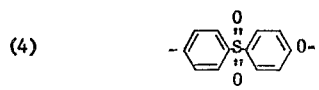

or mixtures of units of Formula 4 with units of the formula (5) 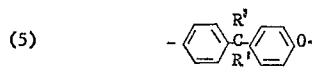

where R' is as previously defined. The preparation of polyaryleneoxides consisting essentially of units of Formula 4 or mixtures of Formulas 4 and 5 are described by A. S. Hay in Advances in Polymer Sciences, vol. 4, pages 496–527 (1967).

Some of the imido-substituted polyaryleneoxide which consists essentially of chemically combined units of Formula 3, are imido-substituted polyphenyloxides of the formula, (6) 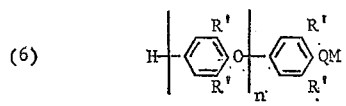

where M, Q, R' and $n$ are as previously defined.

Additional imido-substituted polyaryleneoxides consisting essentially of chemically combined units of Formula 3, are imido-substituted polyphenyloxide of the formula, (7) 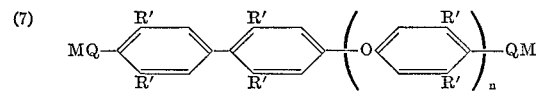

where M, Q, $n$ and R' are as previously defined.

Certain of the imido-substituted polyaryleneoxide compositions of the present invention can be made by effecting reaction between a polyaryleneoxide consisting essentially of chemically combined aryloxy units of the formula, (8)     —AO— and an imido-organo-acyl halide, (9) 

where M, R″ and A are as previously defined, and D is a halogen radical, such as chloro.

Imido-substituted polyaryleneoxide of the present invention also can be made by the Friedel-Crafts alkylation of a polyaryleneoxide consisting essentially of chemically combined aryloxy units of Formula 8, with an imidoalkylene compound of the formula,

(10) 

where M and R' are as previously defined, G is selected from D radicals and hydroxy radical, and $m$ is an integer equal to 2 to 4 inclusive. Radicals included by G are, for example, hydroxy, chloro, bromo, iodo and fluoro.

Included by the imido-substituted organoacyl halides of Formula 9 are compounds such as,

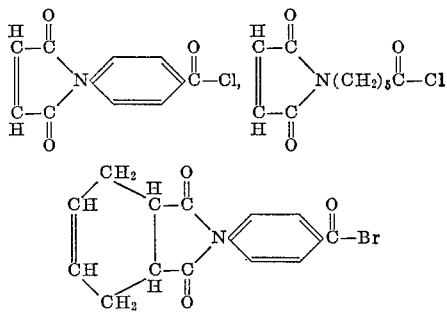

etc.

The imido-substituted polyaryleneoxides of the present invention which are prepared by Friedel-Crafts alkylation utilizing an imido alkyl compound as shown by Formula 10, in the presence of a catalyst, such as boron trifluoride in accordance with the method are described in copending application of J. K. Klebe and T. J. Windish, Ser. No. 838,322 filed concurrently herewith and assigned to the same assignee as the present invention. Some of the imido alkyl compounds included by Formula 10, are, for example,

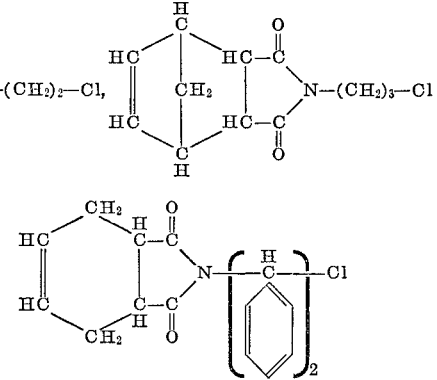

etc.

Some of the polyaryleneoxides consisting essentially of chemically-combined units of Formula 8, can be made by the method described in Hay Pats. 3,306,874 and 3,306,875 assigned to the same assignee as the present invention. In accordance with the teaching of these patents, polyphenyleneoxides can be made by oxidative coupling of a phenol using an aliphatic amine-basic-cupric-salt complex. The polyphenyleneoxide provided by this method can be employed to make the imido-substituted polyphenyleneoxides of Formula 6. In instances where imido-substituted polyphenyleneoxides of Formula 7 are desired, the polyphenyleneoxides provided by the aforedescribed Hay patents can be modified by cleavage procedures utilizing alkali metal substituents of arenes, shown in Hay Pat. 3,442,858, or by an equilibration procedure utilizing a free radical catalyst, such as an aryloxy radical, which procedure is shown in copending application of Cooper and Gilbert, Ser. No. 547,180, now U.S. Pat. No. 3,496,236, filed May 3, 1966 and assigned to the same assignee as the present invention. An additional method is shown by White Pat. 3,367,978, also assigned to the same assignee as the present invention.

The imido-substituted polyaryleneoxides of the present invention also can consist entirely of M-substituted aryloxy radicals of Formula 8. The imido-substituted polyaryleneoxides can be used as molding compounds, varnishes, etc., when utilized with an organic solvent such as tetrachloroethane, ethylenedichloride, etc. The imido-substituted polyaryleneoxide can be made into solvent resistant coating compositions by exposure to high energy electron irradiation, or by curing with peroxides and heat.

The imido-substituted polyaryleneoxides of the present invention can be blended with various aliphatically unsaturated organic materials, such as aliphatically unsaturated organic monomers and certain organic polymers, as well as organic polymers free of aliphatic unsaturation. Blends of the imido-substituted polyaryleneoxides, and the aforementioned organic monomers or polymers can be made over wide proportions by weight. Experience has shown that there can be employed in the blend at least about 5 percent by weight, and preferably from 10 to 50 percent by weight of the imido-substituted polyaryleneoxide based on the total blend weight to provide for cured products exhibiting such valuable characteristics as solvent resistance, toughness, resistance to deformation at elevated temperatures, etc. Depending upon the proportion of the imido-substituted polyaryleneoxide, and the organic polymer, or monomer, the blends can provide for laminates, varnishes, molding compounds, coating compositions, etc.

The aliphatically unsaturated organic monomers which can be employed in combination with the imido-substituted polyaryleneoxides include, for example, styrene, N,N'-p,p-diphenylmethanebismaleimide, bismaleimide, N-phenylmaleimide, diallylphthalate, N,N'-m-phenylenebismaleimide, vinylchloride, isobutylene, butadiene, isoprene, chlorotrifluoroethylene, 2-methylpentene-1; vinyl esters of organic carboxylic acids, such as vinylformate, vinylacetate, acrylonitrile, etc., esters of acrylic and methacrylic acids, etc.; divinylbenzene, triallylcyanurate, triallyltrimellitate, and N-vinylphthalimide, N-allylphthalimide, reaction products of diamines and N-allyltetrachlorophthalimide, etc. Among the organic polymers that can be employed in combination with the imido-substituted polyaryleneoxides of the present invention are, for example, polyvinylchloride, polyphenyleneoxides, polypropylene, polysulfones, polysulfone ethers, epoxy resins, phenol-formaldehyde resins, polystyrene, polyurethane, organopolysiloxanes, polyesters, polycarbonates, acrylonitrile-butadiene-styrene terpolymers, styrene-butadiene block copolymers, etc.

Cure of the imido-substituted polyaryleneoxide or a blend thereof with the aforementioned organic monomers, or polymers, can be effected with conventional free radical initiators at temperatures of from 50° C. to 300° C., while 100° C. to 200° C. has sometimes been found to be more desirable. Acceleration of the cure can be achieved with organic peroxides, such dicumylperoxides, benzoylperoxide, tertiary butylperbenzoate, tertiary alkylperoxycarbonate, higher temperature peroxides such as azodicarbonamides, etc. The peroxides can be employed from about 0.01 percent to about 5 percent by weight, based on the weight of the polyarylene oxide or blend thereof. The imido-substituted polyaryleneoxide or blends thereof, also can be cured with heat, or radiation with high electrons, X-rays, ultraviolet light, etc., depending upon the crosslinked density of the resulting imido-substituted polyaryleneoxides.

In making the imido-substituted polyaryleneoxides of the present invention by the acylation of the polyaryleneoxide consisting essentially of chemically combined units of Formula 8, with an imido-substituted organoacylhalide of Formula 9, an organic solvent can be utilized at temperatures in the range of between 0° C. to 125° C. and preferably 25° C. to 55° C. A suitable organic solvent which can be employed to facilitate the formation of the imidosubstituted polyaryleneoxides, is an organic solvent inert to the reactants during the conditions of the reaction. For example, there can be employed such solvents as nitrobenzene, tetrachloroethane, chloro and o-dichlorobenzene, chloroform, carbon tetrachloride, carbon disulfide, etc.

Recovery of the imido-substituted polyaryleneoxides can be achieved by effecting the precipitation of the polymer is an alcohol, such as methanol.

The preparation of the imido-substituted polyaryleneoxides by the Friedel-Crafts alkylation of polyaryleneoxide, can be achieved by using an imido-alkylene compound of the Formula 10, in the presence of a Friedel-Crafts catalyst such as borontrifluoride, aluminumchloride, ferricchloride, etc. The alkylation can be performed at temperatures in the range of between 0° C. and 125° C., and preferably in the range of between 25° C. and 55° C. One method, for example, involves agitating a solution of the polyaryleneoxide and the imido-substituted alkyl halide in a suitable organic solvent, such as tetrachloroethane, nitrobenzene, orthodichlorobenzene, etc., while slowly introducing the Friedel-Crafts catalyst. Reaction can be performed over a period of from 1 hour to 60 hours, depending upon the conditions employed, the type of imido-substituted alkyl halide used, etc. Recovery of the imido-substituted polyaryleneoxide can be achieved at the termination of the alkylation by the employment of a low molecular weight aliphatic alcohol such as methanol, etc.

In addition to the aforementioned aliphatically unsaturated monomers and organic polymers which can be employed with the imido-substituted polyaryleneoxides there also can be employed in proportions of 0 to 200 parts of fillers, per 100 parts of the imido-substituted polyaryleneoxide, such as treated clay, ground quartz, glass beads, fume silica, sand, carbon black, glass fibers, quartz fibers, carbon fiber, asbestos, etc. In addition, other ingredients such as solvents at from 60 percent to 90 percent by weight of the curable compositions such as N-methyl pyrrolidone, dimethylacetamide, toluene, methylenechloride, plasticizers such as dioctyl phthalate, chlorinated biphenyl, etc., also can be utilized.

In order that those skilled in the art will be better able to practice the present invention, the following examples are given by way of illustration and not by way of limitation. All the parts are by weight.

EXAMPLE 1

42 parts of a poly(2,6 - dimethyl - 1,4 - phenyleneoxide) having a molecular weight of about 2,500, 4.7 parts of p-maleimidobenzoylchloride, and 100 parts of tetrachloroethylene was refluxed and stirred under nitrogen for 22 hours. The product was precipitated in methanol, and dried in vacuo at 95° C. Based on the method of preparation, the product was an imido-substituted polyphenyleneoxide, having the approximate average formula,

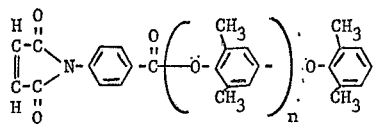

where $n$ has an average value of about 20.

The above imido-substituted polyphenyleneoxide melted at 155° C. A film was produced after heating the melt for 5 minutes at 225° C. The melt could be extruded onto a copper wire to make an insulated conductor.

EXAMPLE 2

A mixture of 9.25 parts of a poly(2,6-dimethyl-1,4-phenyleneoxide) having an average of about 7.2 phenylene oxide units and terminal hydroxy radicals, 4.71 parts of p-maleimidobenzoylchloride, and 30 parts of tetrachloroethane was stirred and refluxed under nitrogen for 6 hours. The mixture was added to methanol in a Waring Blendor to effect the precipitation of product. The product was filtered and dried in an air stream. Based on method of preparation, the product had the approximate average formula,

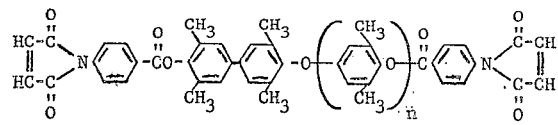

where $n$ has a value of about 7.2. The identity of the product was confirmed by N analysis (wt. percent) Theoretical: 1.87, Found: 1.84.

A film of the above product was cast from a tetrachloroethylene solution containing 20 percent by weight polymer and 5 percent by weight of dicumyl peroxide. The film was cured at 150° C. for 1 hour, and 200° C. for 1 hour. A tough thermoset film was obtained.

The cured film was placed in an oven under a 1,000 g. load between two copper wires having an average diameter of 50 mil. It performed as a satisfactory insulator until cut-through resulted at a temperature of 245° C.

EXAMPLE 3

Various blends were made of the imido-substituted polyphenyleneoxide, of Example 2, and various aliphatically unsaturated organic monomers specifically, styrene, diallylphthalate, and N-phenylmaleimide. The blends consisted of 50 parts of the imido-substituted polyphenyleneoxide, 50 parts of the aliphatically unsaturated organic monomer and 2 parts of benzoyl peroxide.

Films were cast on an aluminum substrate from a 20 percent ethylenedichloride solution. The films were cured at 80° C., 125° C. and 220° C. for 1 hour at each temperature. The cured films were found to be valuable solvent resistant, insulating coating compositions. The films were self-supporting and insoluble in methylene chloride. The films were rubbery at 250° C. and did not melt at temperatures up to 310° C.

EXAMPLE 4

The imido-substituted polyphenylene oxide of Example 2, was blended with various polymers and an organic peroxide to produce blends having 33 parts of the imido-substituted polyphenylene oxide, 65 parts of organic polymer and 2 parts of dicumyl peroxide. Blends also were made free of imido-substituted polyphenylene oxide consisting of 98 parts of organic polymer and 2 parts of dicumylperoxide.

One of the blends consisted of the imido-substituted polyphenylene oxide of Example 2, and a poly(2,6-dimethyl-1,4-phenylene oxide) having an intrinsic viscosity in chloroform at 25° C. of 0.49. Another blend consisted of the imido-substituted polyphenylene oxide of Example 2, and a polycarbonate made by phosgenating 2,2-bis (4-hydroxyphenyl) propane having an intrinsic viscosity of 0.5 in dioxane at 30° C. The blends free of imido-substituted polyphenylene oxide contained 98 parts respectively of the aforementioned poly(2,6-dimethyl-1,4-phenylene oxide) and polycarbonate.

Films were cast on an aluminm substrate from a 20 percent solid solution in tetrachloroethane of the above blends. The blends were cured at 125° C. for 1 hour and 200° C. for 1 hour. The films were found to be tough and flexible. The film made from the imido-containing polyphenylene oxide blend had a cut-through of 190° C., while polyphenylene oxide blend free of imido-substituted polymer had a cut-through of 170° C. A comparison of films made from the polycarbonate blends showed 185° C. cut-through for the imido-containing blends as compared to 150° C. cut-through of the film made from the imido free blend. In measuring cut-through, the film was placed between 150 mil conducting wires under a 1,000 gram load in accordance with the method described in Precopio et al. Pat. 2,936,296.

Based upon the above results, those skilled in the art would know that the blends of the imido-substituted polyphenylene oxide of the present invention would be valuable injection molding compounds.

EXAMPLE 5

N-(2-chloroethyl)tetrahydrophthalimide was made by the following procedure:

A mixture of 10 parts of N-(2-hydroxyethyl)tetrahydrophthalimide, which had been prepared from tetrahydrophthalic anhydride and ethanolamine by standard procedure, was refluxed with 25 parts of thionylchloride for about 2 hours. Excess thionylchloride was distilled off and the residue purified by recrystallization from methanol. There was obtained a crytsalline product. Based on method of preparation and the aforementioned melting point, the product was N-(2-chloroethyl)tetrahydrophthalimide.

A mixture was made of 2.5 parts of a poly-(2,6-diphenyl-1,4-phenylene oxide) having an intrinsic viscosity of 0.82 in chloroform at 25° C., 2 parts of N-(2-chloroethyl)tetrahydrophthalimide, 1 part of aluminum chloride, 35 parts of anhydrous tetrachloroethane, and 15 parts of anhydrous nitrobenzene. The solution was stirred at a temperature of 90° C. over a period of 15 hours. The product was precipitated upon addition to methanol. Based on method of preparation and infrared carbonyl absorption at 1,700 cm.$^{-1}$, the product was a tetrahydrophthalimidoethyl-substituted polyphenylene oxide having an average of about 300 chemically combined phenylene oxide units, of which about 25 mole percent are units substituted with tetrahydrophthalimidoethyl radicals,

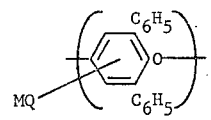

where MQ is a tetrahydrophthalimidoethyl radical, which are chemically combined with about 75 mole percent of phenylene oxide units of the formula,

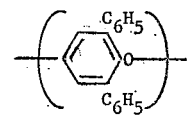

A film of the imido-substituted polyphenylene oxide is cast from a tetrachlorethane solution onto an aluminum substrate. The film is exposed to β-radiation to a dosage of 50 MR. It is found to be insoluble in several organic solvents including tetrachlorethane and useful as an organic solvent resistant coating.

EXAMPLE 6

A polyarylene ether having a molecular weight of about 10,000 and terminal hydroxy radicals which consists essentially of chemically combined,

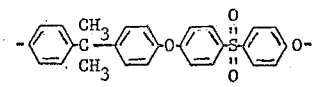

units is prepared in accordance with the teachings of A. S. Hay, Advances in Polymer Science, vol. 4, pages 496–527 (1967).

A mixture of 10 parts of p-maleimido-benzoyl chloride, and 90 parts of the above polymer is stirred and refluxed under nitrogen for 6 hours utilizing about 30 parts of tetrachloroethane as a solvent. The mixture is then added to methanol to effect the precipitation of product. A quantitative yield of product is obtained.

Based on method of preparation and its infra-red spectrum, the product is an imido-substituted polymer having the approximate average formula,

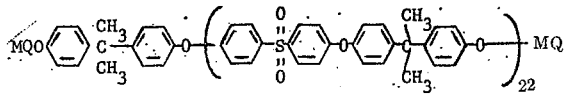

where MO is,

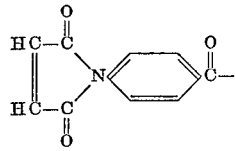

A 10 percent tetrachloroethylene solution of the above polymer is used to cast a film on an aluminum substrate. The film is exposed to a 50 MR dose of β-radiation. A solvent resistant film is obtained which exhibits valuable insulating and dielectric properties.

Although the above examples are limited to only a few of the many imido-substituted polyarylene oxide included by the present invention, it should be understood that the present invention is directed to a much broader class of imido-substituted polyarylene oxide consisting essentially of chemically combined units of Formula 2, which include diorgano radicals having chemical combined imido radicals of Formula 1, where the N atom of such imido radicals either can be directly joined to the diorgano radicals of the polymer, either in the terminal position, or in the polymer backbone, or be joined to the polymer by a divalent connecting organo radical having 2 or more carbon atoms, including alkylene radicals such as —(CR′$_2$)$_x$—, where $x$ is an integer having a value of from 2 to 4 inclusive and R′ is as previously defined, divalent aromatic carbocyclic radicals having from 6 to 18 carbon atoms, where such alkylene radicals or divalent aromatic carbocyclic radicals can be joined directly to the polymer by a carbon-carbon bond or an ester, amide, carbonate or ether linkage.

We claim:

1. A blend curable to the solvent resistant state containing as essential ingredients of by weight, (a) at least about 5 percent of an imido substituted film forming polyaryleneoxide and correspondingly, (b) up to about 95 percent of organic polymer, where (a) consists essentially of divalent aryleneoxy units of the formula

—ZO— and terminal imido radicals of the formula,

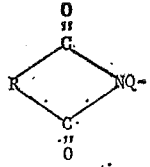

Q is a divalent organo connective selected from the class consisting of

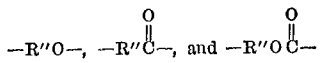

(b) is a member selected from the class consisting of polyvinyl chloride, polyphenyleneoxide, polypropylene, polyarylenesulfone, polyarylenesulfone ether, polystyrene, acrylonitrile - butadiene-styrene copolymer, polyarylenecarbonate, and mixtures thereof, R is a divalent aliphatically unsaturated hydrocarbon radical, Z is a divalent organo radical selected from the class consisting of aromatic hydrocarbon radical, —AYA— radicals and a mixture thereof, A is a divalent aromatic hydrocarbon radical, Y is a member selected from the class consisting of

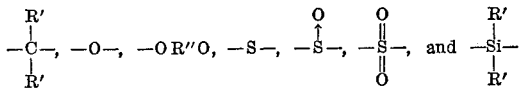

R′ is hydrogen or a monovalent hydrocarbon radical, and R″ is a divalent hydrocarbon radical.

2. A curable blend in accordance with claim 1, where the film forming polyaryleneoxide is mono-substituted in the terminal position with said imido radical.

3. A curable blend in accordance with claim 1, where the organic polymer is a polyphenyleneoxide.

4. A curable blend in accordance with claim 1, where the organic polymer is a polyarylenecarbonate.

5. A curable blend in accordance with claim 1, where the imido substituted polyaryleneoxide is substituted with maleimido radicals.

6. A curable blend in accordance with claim 1, where the film forming polyphenyleneoxide has recurring units of the formula,

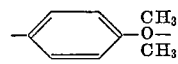

7. A curable blend in accordance with claim 1, where the film forming polyphenyleneoxide has recurring units of the formula,

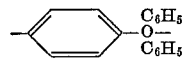

8. A curable blend in accordance with claim 1, where the film forming polyphenyleneoxide has recurring units of the formula,

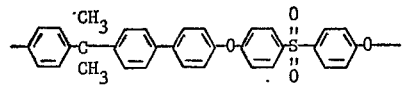

9. A curable composition in accordance with claim 1, having an effective amount of an organic peroxide.

References Cited

UNITED STATES PATENTS

| | | | |
|---|---|---|---|
| 3,221,080 | 11/1965 | Fox | 260—47 |
| 3,306,874 | 2/1967 | Hay | 260—47 |
| 3,352,832 | 11/1967 | Barr et al. | 260—78 |
| 3,373,226 | 3/1968 | Gowan | 260—47 |
| 3,380,964 | 4/1968 | Grundschober et al. | 260—78 |

HAROLD D. ANDERSON, Primary Examiner

U.S. Cl. X.R.

117—161 P, 161 VA; 161—183, 247; 204—14, 159; 260—33.8 VA, 37 N, 47 CZ, 47 VA, 49, 78 VA, 47 XA, 827, 836, 844, 873, 874, 875, 880 R, 886, 899